US012324409B2

(12) United States Patent
Marks et al.

(10) Patent No.: US 12,324,409 B2
(45) Date of Patent: Jun. 10, 2025

(54) TERRARIUM WITH A CATCH TRAY, INTERIOR CATCH TRAY, METHODS OF USE AND METHODS OF ASSEMBLY

(71) Applicant: EcoTech, LLC, Bethlehem, PA (US)

(72) Inventors: Timothy Marks, Northampton, PA (US); Justin Lawyer, Bethlehem, PA (US); Patrick Clasen, Allentown, PA (US); Christian Clough, Bethlehem, PA (US); Harry Ambler, Allentown, PA (US)

(73) Assignee: ECOTECH, LLC, Bethlehem, PA (US)

( * ) Notice: Subject to any disclaimer, the term of this patent is extended or adjusted under 35 U.S.C. 154(b) by 183 days.

(21) Appl. No.: 17/894,699

(22) Filed: Aug. 24, 2022

(65) Prior Publication Data

US 2023/0065863 A1     Mar. 2, 2023

Related U.S. Application Data

(60) Provisional application No. 63/236,346, filed on Aug. 24, 2021.

(51) Int. Cl.
*A01K 63/00* (2017.01)
*A01K 1/015* (2006.01)

(52) U.S. Cl.
CPC .......... *A01K 1/0157* (2013.01); *A01K 63/006* (2013.01)

(58) Field of Classification Search
CPC .......... A01K 1/00; A01K 1/0157; A01K 1/03; A01K 63/003; A01K 63/006; A01K 63/00;

(Continued)

(56) References Cited

U.S. PATENT DOCUMENTS 3,684,155 A    8/1972   Smith
4,791,883 A  * 12/1988  Lehman ............... B65D 5/0005
                                                  229/101

(Continued)

FOREIGN PATENT DOCUMENTS

FR        2608012 A1 *  6/1988  ............... A01K 1/01
WO   WO2018104550 A1 *  6/2018  ............... A01K 1/01

OTHER PUBLICATIONS

International Search Report & Written Opinion, dated Nov. 28, 2022, from related PCT Application No. PCT/US22/41366.

*Primary Examiner* — Peter M Poon
*Assistant Examiner* — Carly W. Lynch
(74) *Attorney, Agent, or Firm* — CALDERON SAFRAN & WRIGHT P.C.

(57) ABSTRACT

A catch tray for a terrarium container. The tray comprises a rectangular bottom wall, first opposite rectangular side walls each separated from the bottom wall by one of first folding lines, and second opposite rectangular side walls each separated from the bottom wall by one of second folding lines. Each of the first and second side walls is oriented upwardly with respect to the bottom wall and connected to the bottom wall by the corresponding first or second folding line. Each of the first side walls is separated from adjacent one of the second side walls by two triangular corner panels connected to each other by a corner folding line and to the adjacent first and second side walls by the first or second folding lines. The triangular corner panels folded inwardly with respect to the side panels so as to define triangle shaped flaps disposed inside the tray.

6 Claims, 6 Drawing Sheets

(58) Field of Classification Search
CPC .... F16B 21/082; F16B 21/084; F16B 21/086; F16B 19/04; F16B 2019/045; F16B 19/05; F16B 2019/055; F16B 19/06; F16B 19/08; F16B 19/083; F16B 19/086; F16B 19/10; F16B 2019/1009; F16B 2019/1018; F16B 19/1027; F16B 19/1036; F16B 19/1045; F16B 19/1054; F16B 19/1063

See application file for complete search history.

(56) References Cited

U.S. PATENT DOCUMENTS

| | | |
|---|---|---|
| 5,794,567 A | 8/1998 | Itzhak |
| 2006/0102090 A1* | 5/2006 | Kemp .................... A01K 63/04 119/264 |
| 2008/0236510 A1 | 10/2008 | Silverman |
| 2018/0184628 A1* | 7/2018 | Lawyer .................. A01K 63/06 |

* cited by examiner

TERRARIUM WITH A CATCH TRAY, INTERIOR CATCH TRAY, METHODS OF USE AND METHODS OF ASSEMBLY

CROSS-REFERENCE TO RELATED APPLICATION AND CLAIM TO PRIORITY

This application claims the benefit of U.S. Provisional Patent Application Ser. No. 63/236,346 filed Aug. 24, 2021 by Marks et al., which is hereby incorporated herein by reference in its entirety and to which priority is claimed.

BACKGROUND OF THE INVENTION

1. Field of the Invention

The present invention relates to trays in general and, more specifically, to a catch tray disposed inside of a terrarium having transparent walls, for retention of substrates and water in the terrarium, including methods of use of the catch tray and methods of assembly.

2. Description of the Related Art

Terrariums having transparent, i.e., glass and plastic, walls, suitable for keeping, raising and observing reptiles or amphibians typically are provided with some water areas into which the amphibians can get sufficient in-water exercise and also water for hydration. For that reason, terrariums generally include shallow pools provided for retention of substrates and water in the terrarium. However, conventional reptile and amphibian terrariums with pools of water are relatively expensive and laborious to manufacture.

A terrarium typically has a soil or other like substrate along its bottom, which may also have a dish or the like containing water for the inhabitants. Removal of the soil for cleaning can be difficult and replacing the bottom soil/water layer can be complicated and messy due to the location of the layer and the need to maintain the inhabitants within the terrarium.

Therefore, the need exists to substantially overcome this difficulty encountered with existing terrarium assemblies. Thus, improvements that may enhance performance and quality of a terrarium assembly are possible.

SUMMARY OF THE INVENTION

The present invention provides an interior catch tray for use inside a terrarium container.

According to a first aspect of the present invention, there is provided an interior catch tray adapted to be placed inside a terrarium. The interior catch tray is erectable from an unfolded state to an assembled state from a single-piece sheet blank. The interior catch tray, when assembled, comprises a rectangular bottom wall defined by first and second opposite folding lines thereof, first opposite rectangular side walls, and second opposite rectangular side walls. Each of the first opposite side walls is separated from the bottom wall by one of the first folding lines. Each of the first opposite side walls is oriented upwardly with respect to the bottom wall and is hingedly connected to the bottom wall by the corresponding first folding line. Each of the second opposite side walls is separated from the bottom wall by one of the second folding lines. Each of the second opposite side walls is oriented upwardly with respect to the bottom wall and is hingedly connected to the bottom wall by the corresponding second folding line. Each of the first opposite side walls is separated from adjacent one of the second opposite side walls by two triangular corner panels hingedly connected to each other by a corner folding line and to the adjacent first and second side walls by the first and second folding lines. The triangular corner panels are folded inwardly with respect to the side panels so as to define triangle shaped flaps disposed inside the tray between the first and second opposite side walls.

According to a second aspect of the present invention, there is provided a terrarium assembly. The terrarium assembly includes a terrarium container including a bottom wall, opposite side walls defining longitudinal sides thereof and opposite end walls defining ends thereof, and an interior catch tray disposed within the terrarium container along the bottom wall. The interior catch tray comprises a rectangular bottom wall defined by first and second opposite folding lines thereof, first opposite rectangular side walls, and second opposite rectangular side walls. Each of the first opposite side walls is separated from the bottom wall by one of the first folding lines. Each of the first opposite side walls is oriented upwardly with respect to the bottom wall and is hingedly connected to the bottom wall by the corresponding first folding line. Each of the second opposite side walls is separated from the bottom wall by one of the second folding lines. Each of the second opposite side walls is oriented upwardly with respect to the bottom wall and is hingedly connected to the bottom wall by the corresponding second folding line. Each of the first opposite side walls is separated from adjacent one of the second opposite side walls by two triangular corner panels hingedly connected to each other by a corner folding line and to the adjacent first and second side walls by the first and second folding lines. The triangular corner panels are folded inwardly with respect to the side panels so as to define triangle shaped flaps disposed inside the tray between the first and second opposite side walls.

According to a third aspect of the present invention, a single-piece sheet blank is erectable from an unfolded state to an assembled state to form an interior catch tray adapted to be placed inside a terrarium container on the bottom thereof. The single-piece sheet blank comprises a rectangular bottom wall defined by first and second opposite folding lines, first opposite rectangular side walls, and second opposite rectangular side walls. Each of the first opposite side walls is separated from the bottom wall by one of the first folding lines. Each of the second opposite side walls is separated from the bottom wall by one of the second folding lines. Each of the first opposite side walls is separated from adjacent one of the second opposite side walls by two triangular corner panels hingedly connected to each other by a corner folding line and to the adjacent first and second side walls by the first and second folding lines.

The invention furthermore includes a method for forming a catch tray from a single-piece sheet blank erectable from an unfolded state to an assembled state to form the catch tray. The method comprises the steps of providing a single-piece sheet blank comprising a rectangular bottom wall defined by first and second opposite folding lines thereof, first opposite rectangular side walls and second opposite rectangular side walls, each of the first opposite side walls separated from the bottom wall by one of the first folding lines, each of the second opposite side walls separated from the bottom wall by one of the second folding lines, each of the first opposite side walls separated from adjacent one of the second opposite side walls by two triangular corner panels hingedly connected to each other by a corner folding and to the adjacent first and second side walls by the first and second folding lines. Next, the first side walls and the second side walls are folded in the same direction with respect to the bottom wall along the first and second folding lines, respectively. Then, the adjacent triangular corner panels between the first and second side walls are folded inwardly along the corner folding lines and along the first and second folding lines so as to define triangle shaped flaps disposed between the first and second opposite side walls.

Other aspects of the invention, including systems, assemblies, subassemblies, methods, processes, and the like which constitute part of the invention, will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings.

DETAILED DESCRIPTION OF EXEMPLARY EMBODIMENT(S)

Figure 1:
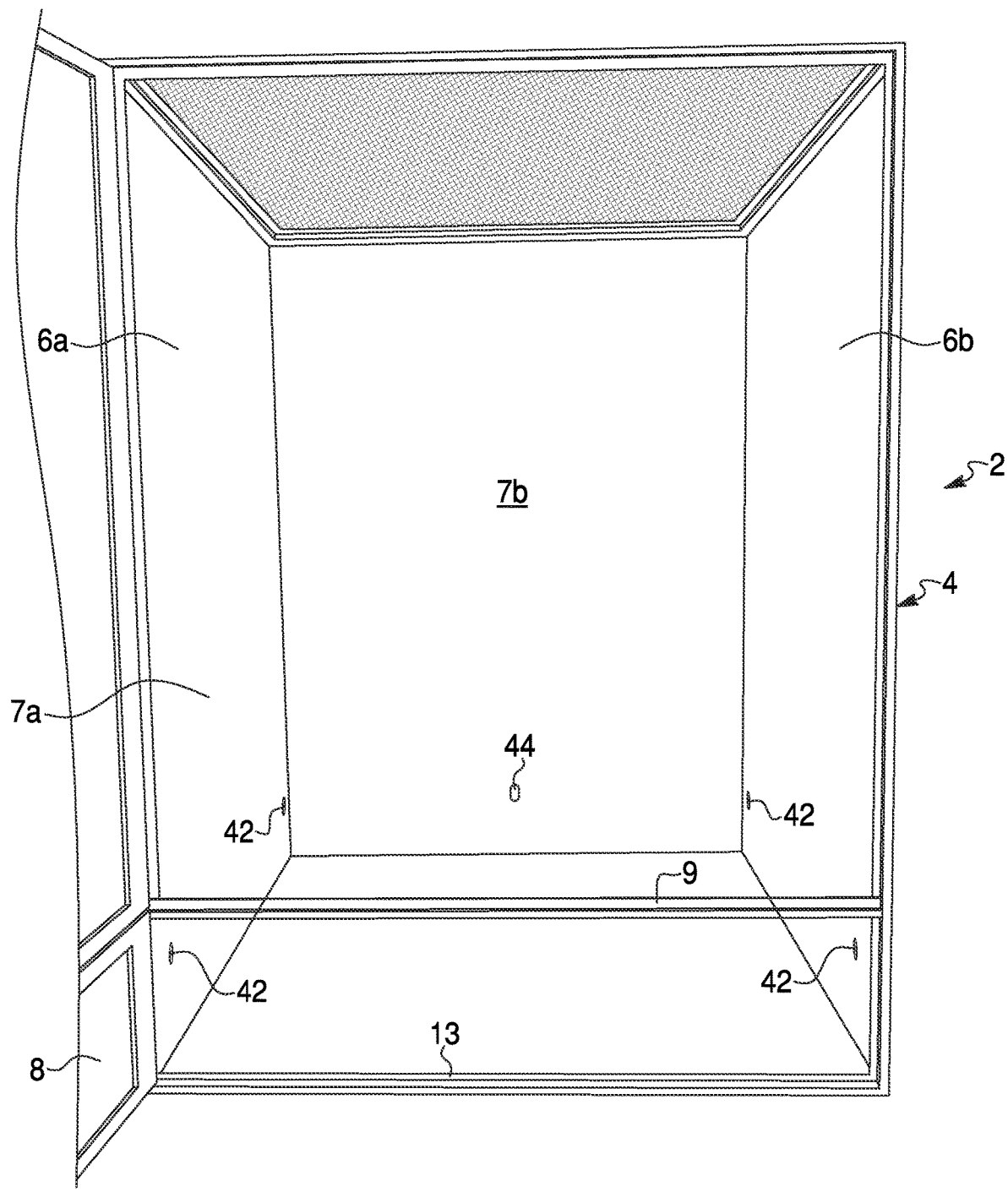
FIG. 1 is a perspective view of a terrarium container.

Reference will now be made in detail to the exemplary embodiments and exemplary methods as illustrated in the accompanying drawings, in which like reference characters designate like or corresponding parts throughout the drawings. It should be noted, however, that the invention in its broader aspects is not necessarily limited to the specific details, representative materials and methods, and illustrative examples shown and described in connection with the exemplary embodiments and exemplary methods.

This description of exemplary embodiments is intended to be read in connection with the accompanying drawings, which are to be considered part of the entire written description. In the description, relative terms such as "horizontal," "vertical," "front," "rear," "upper", "lower", "top" and "bottom" as well as derivatives thereof (e.g., "horizontally," "downwardly," "upwardly," etc.) should be construed to refer to the orientation as then described or as shown in the drawing figure under discussion and to the orientation relative to a vehicle body. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The term "integral" (or "unitary") relates to a part made as a single part, or a part made of separate components fixedly (i.e., non-moveably) connected together. Additionally, the word "a" and "an" as used in the claims means "at least one" and the word "two" as used in the claims means "at least two".

Figure 2:
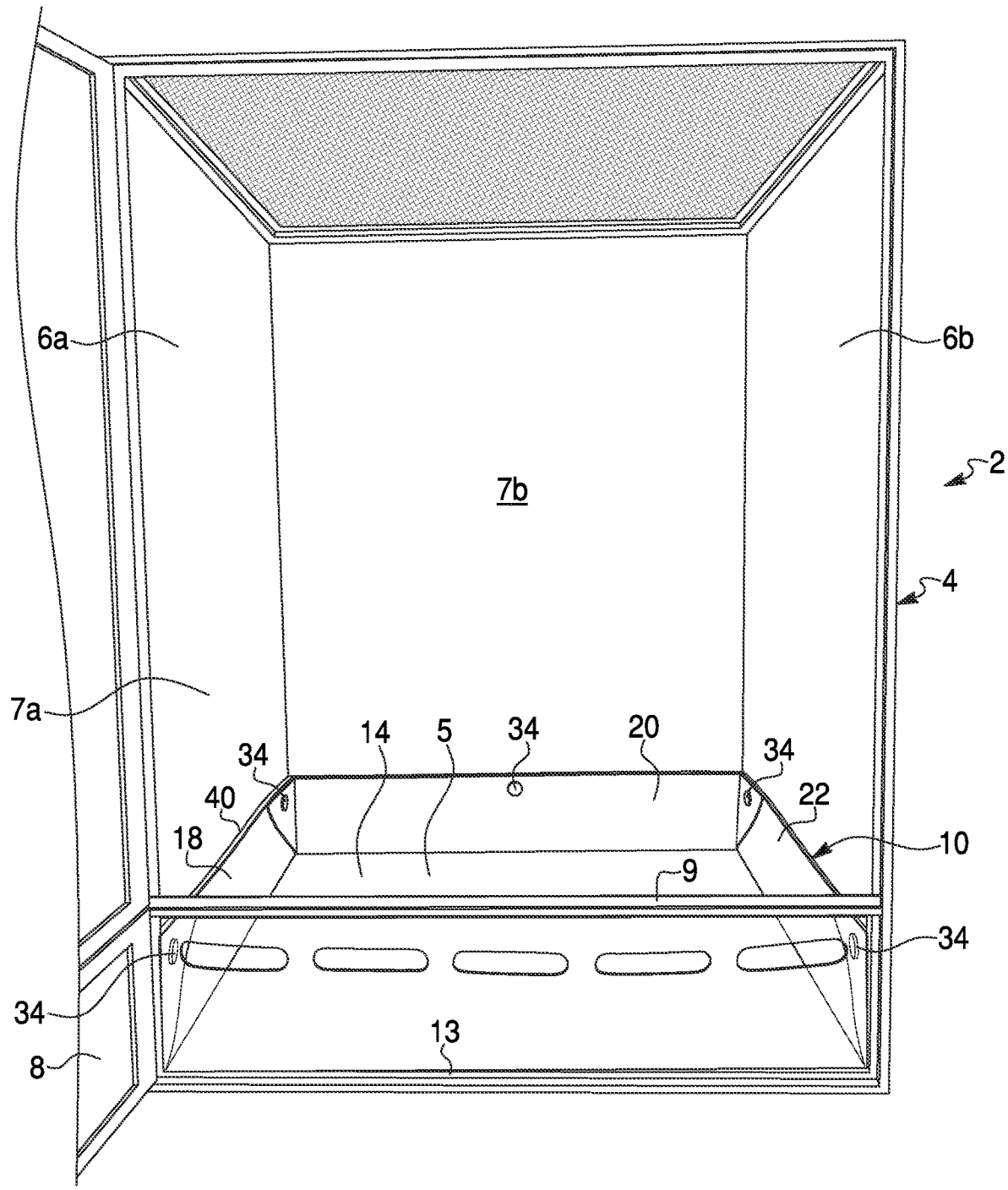
FIG. 2 is a perspective view of a terrarium assembly according to an exemplary embodiment of the present invention.
Figure 7:
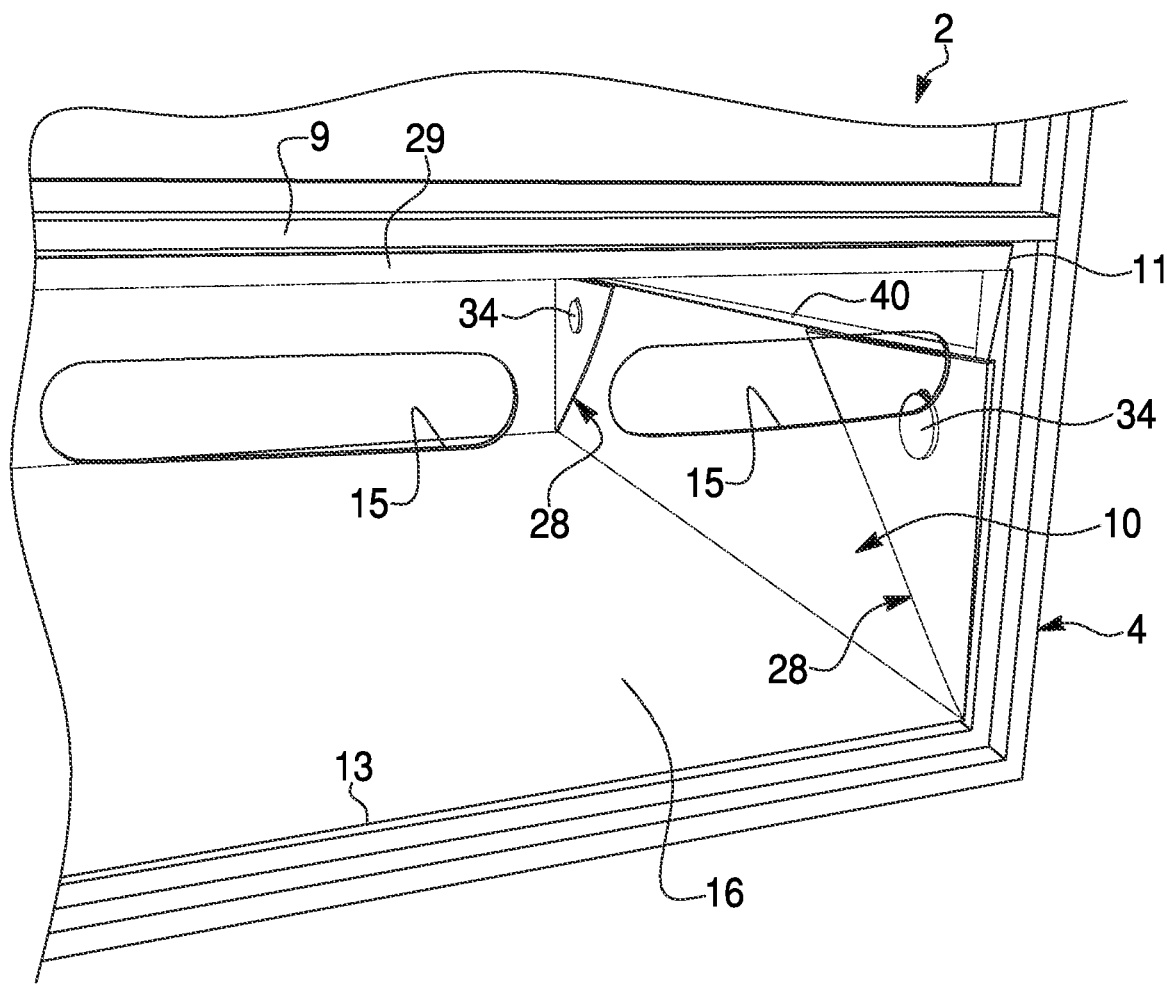
FIG. 7 is a partial perspective view from outside of the terrarium assembly according to the exemplary embodiment of the present invention showing a screen door.

FIG. 2 shows a terrarium assembly 2 according to an exemplary embodiment of the present invention comprising a terrarium container 4 (best shown in FIG. 1) and an interior catch tray 10 disposed in the terrarium container 4. The terrarium container 4, as known in the art, is generally a rectangular structure formed of a suitable, typically transparent material, such as glass, plexiglass, perforated screen, etc. The terrarium container 4 is constructed in a rectangular shape and includes a horizontally disposed bottom wall 5, vertically disposed opposite side walls 6a, 6b defining its longitudinal sides, and vertically disposed opposite front and rear end walls 7a and 7b, respectively, defining ends thereof. The front end wall 7a may include a pivotal screen door 8 disposed between the bottom wall 5 and a crossbar 9 of the terrarium container 4. The crossbar 9 is vertically spaced from and parallel to the bottom wall 5, as best shown in FIGS. 1, 2 and 7. The screen door 8 is configured to selectively provide access into the terrarium container 4 through an opening 13 in the front end wall 7a between the bottom wall 5 and the crossbar 9.

The interior catch tray 10 is configured to retain substrates, such as soil and water in the terrarium container 4. The interior catch tray 10 is movable between an assembled (or erected) state (or position), best shown in FIG. 2, and a flat (unfolded) state (or position), best shown in FIG. 3. In the erected position illustrated in FIG. 2, the interior catch tray 10 stands stably upright on a flat surface, such as on the bottom wall 5 of the terrarium container 4.

The interior catch tray 10 is formed from a unitary blank (or sheet blank) 12 of a single-piece, substantially flat sheet of plastic material, such as thermoplastic polymer resin of the polyester family, or any other appropriate relatively stiff but foldable material. The material of the blank 12 according to the exemplary embodiment is a thin, durable, transparent, and formable PET (polyethylene terephthalate) material (also known as PETE), which is easily folded into shape. Moreover, PET is a strong, durable, flexible plastic. The PET material is FDA (Food and Drug Administration) approved for use in food and beverages and is globally accepted in medical applications. The sheet blank 12 is liquid-proof or waterproof (water-impermeable). The catch tray 10 is packaged as a blank 12, which is a flat sheet (i.e., in the flat state), for easy shipping. Conventionally, the flat sheet blank 12 also comes with an easy peel-off film, to protect the sheet during shipping. The flat blank sheet 12 is die cut and is preferably about 0.02 inches thick. This makes the sheet blank 12 transparent, formable, and lightweight. The blank 12 and the interior catch tray 10 formed therefrom can be of any size depending on the terrarium container 4 the interior catch tray 10 is provided for.

Figure 3:
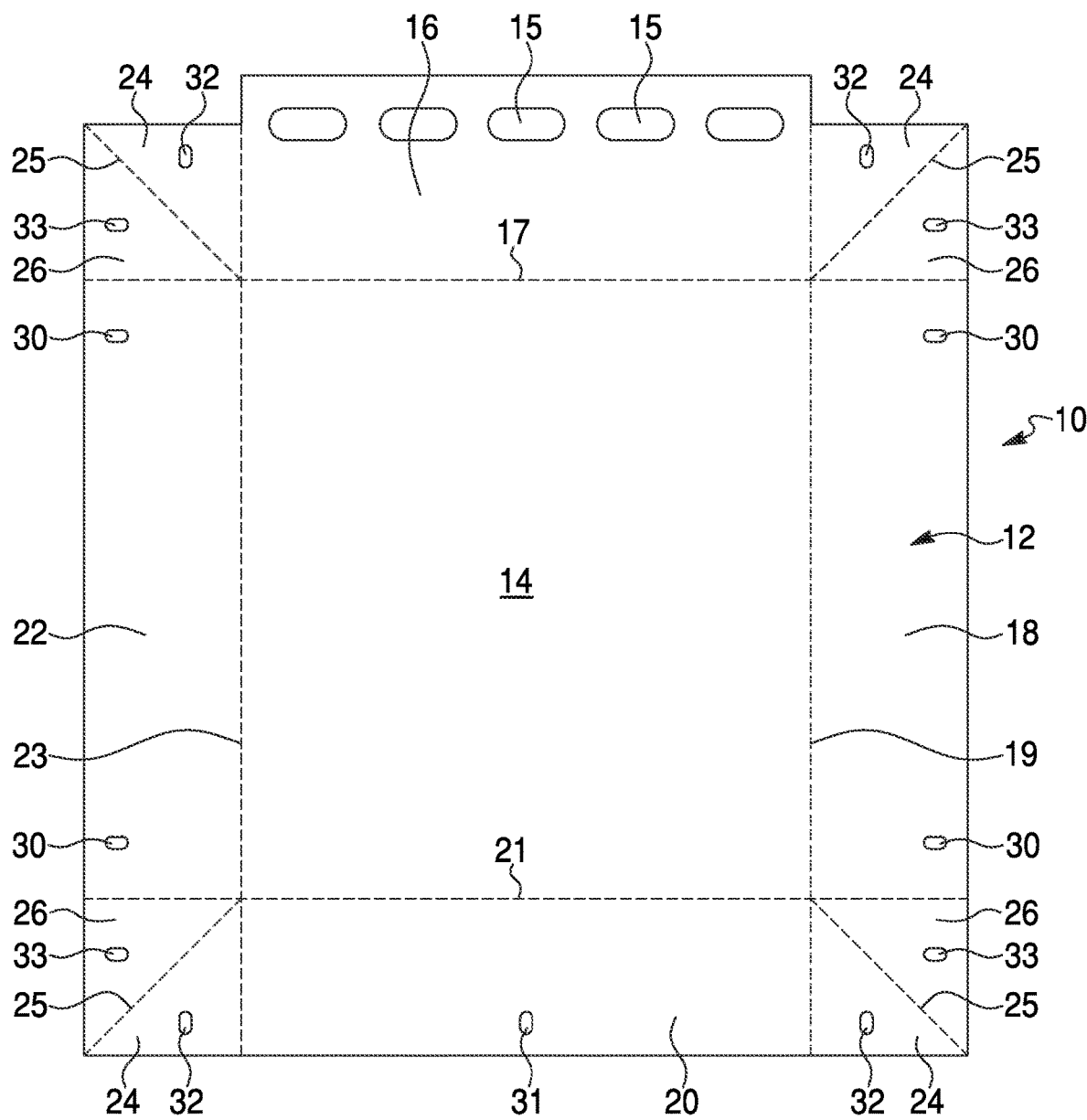
FIG. 3 is a top view of a single-piece sheet blank of a catch tray in a flat state according to an exemplary embodiment of the present invention.

The sheet blank 12 is indented or creased to form a plurality of folding (e.g., creasing or scoring) lines best shown in FIG. 3. Folding lines are the lines along which the resulting product is folded. The blank 12, when assembled, has a rectangular bottom wall 14 defined by four sides, and four rectangular side walls (or panels) 16, 18, 20, 22 formed unitarily with the bottom wall 14 and connected to each other and to the bottom wall 14. Specifically, the rectangular side walls include first opposite rectangular side walls 16, 20 and second opposite rectangular side walls 18, 22. More specifically, the first opposite rectangular side walls 16, 20 include a front side wall 16 and a rear side wall 20. The side walls 18, 20, 22 have the same height from bottom wall 14, while the height of the front side wall 16 is greater than the side walls 18, 20, 22.

The sheet blank 12 is divided into the bottom wall 14 and the side walls 16, 18, 20, 22 by first and second creased or scored folding lines 17, 19, 21, 23, as best shown in FIG. 3. Specifically, the first opposite rectangular side walls 16 and 20 are separated from the bottom wall 14 by first folding lines 17 and 21, respectively, while the second opposite rectangular side walls 18 and 22 are separated from the bottom wall 14 by second folding lines 19 and 23, respectively. The first folding lines 17 and 21 are perpendicular to the second folding lines 19 and 23. In other words, the first and second side walls 16, 18, 20, 22 are hingedly connected to the bottom panel 14 by the first and second folding lines 17, 19, 21, 23 due to the nature of the PET material forming the sheet blank 12. The folding lines 17, 19, 21, 23 may be formed by suitable equipment that causes a crease to be formed in the blank 12, so that the side walls may be folded thereabout.

Between each two adjacent rectangular first and second side walls 16, 18, 20, 22 is a respective set of adjacent first and second triangular corner panels 24 and 26, respectively, integrally formed with the first and second opposite side walls 16, 18, 20, 22. As can be seen from FIG. 3, each of the triangular corner panels is formed from a rectangular panel.

Figure 4:
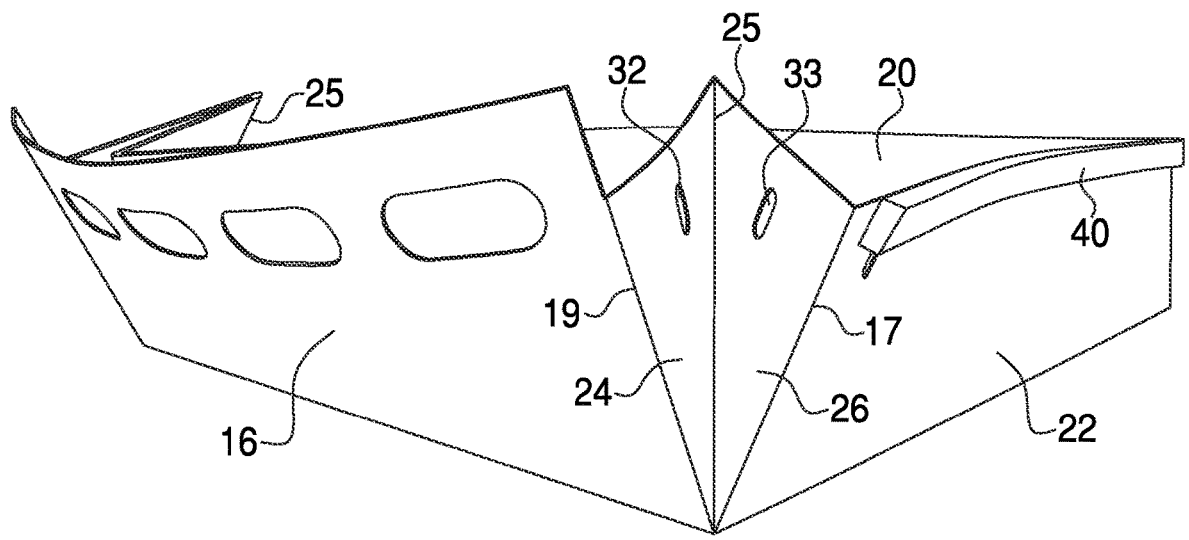
FIG. 4 is a perspective view of a catch tray partially formed from the single-piece sheet blank shown in FIG. 3.

Specifically, the first triangular corner panels 24 are juxtaposed (or adjacent) to the first side walls 16 and 20, while the second triangular corner panels 26 are juxtaposed (or adjacent) to the second side walls 18 and 22. The adjacent first and second triangular corner panels 24 and 26 are positioned side-by-side and hingedly connected to each other by creased or scored corner folding lines 25. Moreover, each of the first and second triangular corner panels 24 and 26 is hingedly connected to the corresponding adjacent first and second side wall 16, 18 and 20, 22, respectively, by one of the creased or scored folding lines 17, 19, 21, 23, as best shown in FIGS. 3 and 4. Specifically, each of the first opposite side walls 16, 20 is separated from an adjacent one of the second opposite side walls 18, 22 by the first and second triangular corner panels 24 and 26 hingedly connected to each other by the corner folding line 25 and to the adjacent first and second side walls 16, 20 and 18, 22, respectively, by the first and second folding lines 17, 19 and 21, 23, as best shown in FIG. 3. In this way, the catch tray 10 forms a solid container for the soil substrate, while also preventing leakage from the water vessel.

Figure 5:
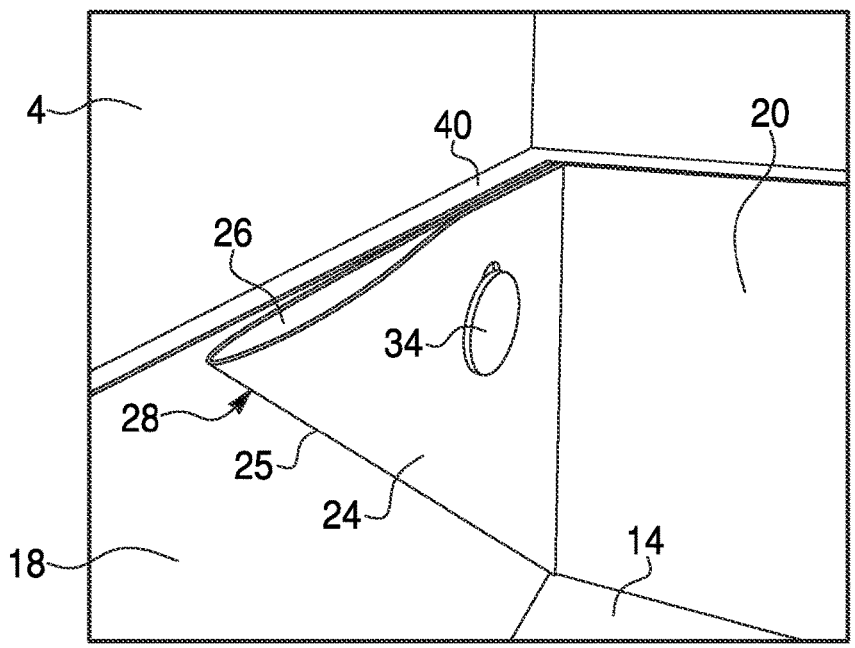
FIG. 5 is a partial perspective view from inside of a corner of the terrarium assembly according to the exemplary embodiment of the present invention.

The adjacent triangular corner panels 24 and 26 are configured to be folded so that they are positioned inside of the catch tray 10, as shown in FIGS. 4, 5 and 7. Also, the triangular corner panels 24 and 26 are configured to be folded over one another and over the first side walls 16, 20 or second sidewalls 18, 22. According to the exemplary embodiment, the adjacent triangular corner panels 24 and 26 are folded over the second opposite side walls 18 and 22, as best shown in FIGS. 4, 5 and 7. Alternatively, the adjacent triangular corner panels 24 and 26 may be folded over the first opposite side walls 16 and 20, or any combination of the first and second side walls 16, 18, 20, 22.

Moreover, at least one, but preferably each of the two second opposite side walls 18 and 22 of the sheet blank 12 has at least one, preferably two precut elongated side apertures 30, each adjacent to one of the triangular corner panels 24, 26, as best shown in FIG. 3. Each of the triangular corner panels 24 and 26 has one precut elongated corner aperture 32 and 33, respectively. The side apertures 30 are preferably geometrically identical to the corner apertures 32 and 33. According to the exemplary embodiment, the adjacent corner apertures 32, 33 and side aperture 30 are aligned with each other when the triangular corner panels 24, 26 are folded inwardly along the corner folding lines 25 so as to contact one another. Also, the rear side wall 20 has a precut elongated rear aperture 31 preferably geometrically identical to the side apertures 30 and the corner apertures 32 and 33, as best shown in FIG. 3. The elongated side apertures 30, corner apertures 32 and 33, and the rear aperture 31 are formed in the sheet blank 12, preferably by punching out through the sheet blank 12.

A plurality of front holes 15 are formed in one of the first and second side walls 16, 18, 20, 22 of the catch tray 10. In the exemplary embodiment, the front holes 15 are formed in the front side wall 16, as best shown in FIGS. 3 and 7, so that the front holes 15 formed in the front side wall 16 face the opening 13 in the front end wall 7a of the terrarium container 4 when the interior catch tray 10, in the assembled state, is disposed in the terrarium container 4. A stamping operation preferably punches out wide oval holes defining the front holes 15.

A top (or outer) edge 29 of the front side wall 16 of the catch tray 10 with the front holes 15 is positioned between the crossbar 9 and the screen door 8 of the terrarium container 4. The top edge 29 extends above bottom wall 14 by a distance that exceeds the distance the top edge of the other sidewalls extends above bottom wall 14. The extra distance of top edge 29 creates an overlap. The overlap, depicted by the reference numeral 11, best shown in FIG. 7, allows the front side wall 16 to be captured and restrained by the front lower screen door 8 when the screen door 8 is closed, thus restraining catch tray 10 between the crossbar 9 and the screen door 8 (when the screen door 8 is closed). The crossbar 9 and screen door 8 reinforce a front side of the catch tray 10. The front holes 15 provide ventilation for the terrarium container 4.

Figure 6:
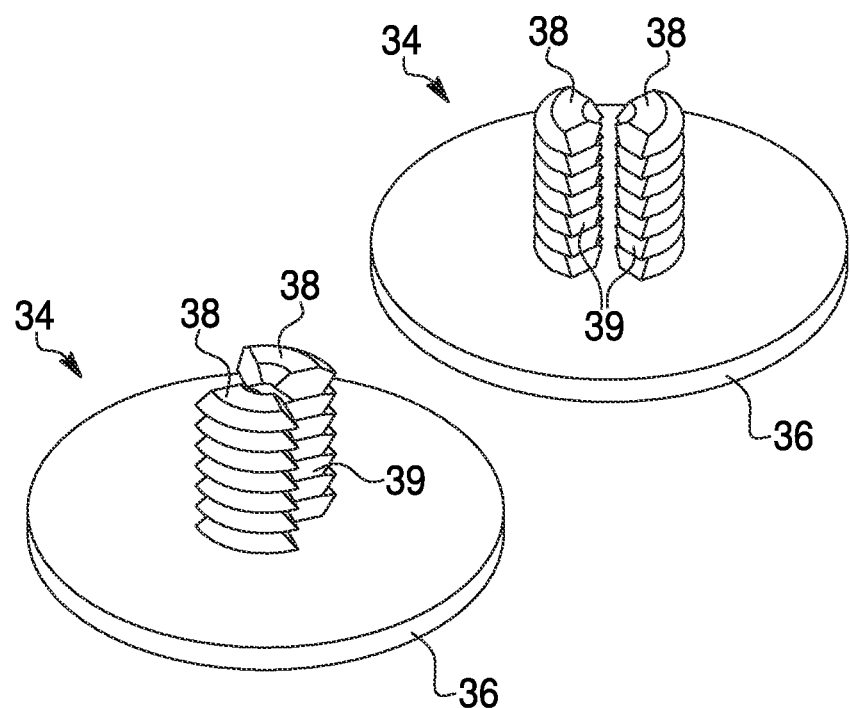
FIG. 6 is a perspective view of rivets according to an exemplary embodiment of the present invention.

The catch tray 10 further comprises mechanical fasteners, such as rivets 34, for maintaining the second side walls 18, 22 of the catch tray 10 in the assembled state to the side walls 6a, 6b of the terrarium container 4. The rivets 34, as best shown in FIG. 6, are preferably made of plastic. Specifically, the folded catch tray 10 creates triangular (i.e., triangle shaped) flaps 28, formed by the triangular corner panels 24 and 26 folded inwardly along the corner folding lines 25 and along the first and second folding lines 17, 19, 21, 23. The triangular flaps 28 are secured to the opposite side walls 6a, 6b of the terrarium container 4 by the plastic rivets 34, as best shown in FIGS. 1, 4 and 6.

Furthermore, the opposite side walls 6a, 6b of terrarium container 4 are formed with side holes 42, best shown in FIG. 1, which are geometrically identical to the side apertures 30 in the second side walls 18 and 22 of the sheet blank 12. Similarly, the rear end wall 7b of the terrarium container 4 is formed with a rear wall hole 44, best shown in FIG. 1, which are geometrically identical to the rear aperture 31 in the rear side wall 20 of the sheet blank 12.

The side apertures 30 and the corner apertures 32 and 33 through the catch tray 10 line up (or align) with the side holes 42 in the terrarium container 4. Likewise, the rear aperture 31 through the catch tray 10 to lines up (or align)

with the rear wall hole 44 in the terrarium container 4 once the catch tray 10 in the assembled state is placed into the terrarium container 4.

The rivets 34 restrain the rear side wall 20 and the second side walls 18, 22 of the catch tray 10 to the side walls 6a, 6b of the terrarium container 4. Each rivet 34 includes a head (or base plate) 36 that may be in the form of a flat circular member, and at least one, preferably two structurally identical ribbed shafts 38 axially extending from the base plate 36 parallel to each other. Each of the ribbed shafts 38 has a cross-section in the form of a sector of a cylinder, as best shown in FIG. 6. As further illustrated in FIG. 6, each of the ribbed shafts 38 has a plurality of ribs 39 formed an outer peripheral surface thereof and around (i.e., encircling or circumscribing) each of the ribbed shafts 38. The ribs 39 of shaft 38 of one rivet 34 are configured to engage the ribs 39 of another rivet 34. The catch tray 10 is secured to the side walls 6a, 6b of the terrarium container 4 by inserting one of the rivets 34 through the aligned corner apertures 32 and 33, the side aperture 30 and the side holes 42 in the terrarium container 4 from inside of the terrarium container 4 and the catch tray 10, and by inserting another of the rivets 34 through the same side holes 42 in the terrarium container 4 and the same aligned corner apertures 32, 33 and the side aperture 30 from outside of the terrarium container 4. Before engaging each other, the ribbed shafts 38 of the rivets 34 have to be oriented at 90° relative to each other. In such a position, the ribs 39 of the ribbed shafts 38 of one of the rivets 34 engage the ribs 39 of the ribbed shafts 38 of the other rivet 34, thus interlocking the rivets 34 together and retaining the second side walls 18 and 22 of the catch tray 10 to the side walls 6a, 6b of the terrarium container 4. Each ribbed shaft 38 has a triangular shape with ribs 39 on side surfaces thereof. The ribbed shafts 38 of each rivet 34 form triangular spaces therebetween. The rivets 34 are interconnected so that each ribbed shaft 38 of one of the rivets 34 is placed into the space between the ribbed shafts 38 of another rivet 34. In such a position the side ribs 39 on the ribbed shafts 38 of one rivet 34 engage the side ribs 39 on the ribbed shafts 38 of another rivet 34. The precut apertures 30, 32, 33 of the catch tray 10 allow the rivets 34 to retain the shape of the catch tray 10 within the terrarium container 4.

Similarly, the rear side wall 20 of the catch tray 10 is secured to the rear end wall 7b of the terrarium container 4 by inserting the rivets 34 through the aligned rear aperture 31 in the rear side wall 20 of the catch tray 10 and the rear wall hole 44 in the terrarium container 4 from inside and outside of the terrarium container 4.

The terrarium assembly 2 also comprises a double-sided adhesive foam gasket 40, which comes precut with the blank 12, as best shown in FIG. 7. According to the exemplary embodiment, the foam is a closed-cell waterproof foam, such as neoprene. Preferably, the adhesive foam gasket 40 is ¼ inch thick to fill the gap between the side walls 18, 20, 22 of the catch tray 10 and the interior walls 6a, 6b, 7b of the terrarium container 4. The foam gasket 40 is attached along at least a portion of a top edge of the catch tray 10, and an interior side of the walls of the terrarium container 4, as best shown in FIGS. 2, 4, 5 and 7. The adhesive foam gasket 40 provides a watertight fit of the catch tray 10 in the terrarium container 4. According to the present invention, the adhesive foam gasket 40 seals the top edge of at least one of the side walls 16, 18, 20, 22 of the catch tray 10 to the interior walls of the terrarium container 4. According to the exemplary embodiment, the adhesive foam gasket 40 fills the gap between the side walls 18, 20, 22 of the catch tray 10 and the side walls 6a, 6b and the rear end wall 7b of the terrarium container 4, thus sealing top edges of three of the side walls 18, 20, 22 of the catch tray 10 to the interior walls of the terrarium container 4 in a watertight manner (as best shown in FIGS. 2 and 4). Therefore, the restrained and sealed catch tray 10 will retain substrate and/or water therein without losing structural integrity. As a result, the plastic catch tray 10 is firmly retained in the terrarium container 4 and simplifies the process of manufacturing the terrarium assembly, and reduces the fragility of the terrarium assembly.

The rivets 34 allow the catch tray 10 in the assembled state to be slid into position within the terrarium assembly 2 and to be retained in position, with the foam gaskets 40 maintaining a seal about the periphery of the catch tray 10 of the terrarium assembly 2. Should the user wish to remove catch tray 10, then the rivets 34 may be disengaged from one another and the catch tray 10 removed from the terrarium container 4.

The catch tray 10 is formed from the blank 12 using an origami method that is intuitive to a user. A method for forming the catch tray 10, as shown in FIG. 2, from the blank 12, shown FIG. 3, according to the exemplary embodiment of the present invention is schematically illustrated in FIGS. 4 and 5. Specifically, the method of forming the catch tray 10 of the exemplary embodiment comprises the following steps.

First, the first side walls 16, 20 and the second side walls 18, 22 of the flat sheet blank 12 are folded in the same direction with respect to the bottom wall 14 along the first and second folding lines 17, 19, 21 and 23, respectively, so that each of the first side walls 16, 20 and the second side walls 18, 22 is oriented upwardly with respect to the bottom wall 14 about the folding lines 17, 19, 21, 23. While folding the first and second side walls 16, 20 and 18, 22, the adjacent first and second triangular corner panels 24 and 26 between the first and second side walls 16, 20 and 18, 22 are folded inwardly with respect to the first and second side walls 16, 18, 20, 22 along the corner folding lines 25 and along the first and second folding lines 17, 19, 21, 23 so as to define the triangular flaps 28 disposed inside the catch tray 10 between the first and second opposite side walls 16, 20, as best shown in FIG. 4. Specifically, the first and second triangular corner panels 24 and 26 are folded so that the corner aperture 32 and 33 of one pair of the first and second triangular corner panels 24, 26 align with one of the side apertures 30 of an adjacent one of the opposite second side walls 18 and 22 once folded into the catch tray 10. Accordingly, the first and second triangular corner panels 24 and 26 are folded into a plane parallel to one of the opposite side walls 18 and 22 of the catch tray 10, as best shown in FIG. 5. In other words, the adjacent corner apertures 32, 33 and side aperture 30 are aligned with each other when the adjacent triangular corner panels 24, 26 are folded inwardly and along one of the second side walls 18, 22 so as to receive at least one mechanical fastener, such as the rivets 34.

Thus, the sheet blank 12 of the catch tray 10 is manufactured and shipped in the flat state with the folding lines 17, 19, 21, 23, 25 to guide each fold when being assembled by the user. This makes the origami folding style easy for the users to complete themselves. Once folded, the sheet blank 12 will form the catch tray 10.

A method for assembling the terrarium assembly 2, as shown in FIG. 2, according to the exemplary embodiment of the present invention the following steps. First, the catch tray 10 is formed from the flat sheet blank 12 as disclosed above. Then, the erected catch tray 10 is slid into the terrarium container 4 and placed to the bottom wall 5 thereof. Next, the adjacent corner apertures 32, 33 and side apertures 30 in the catch tray 10 are aligned with each other and with the side holes 42 in the terrarium container 4, followed by inserting the rivets 34 (oriented at 90° relative to each other) through the aligned apertures 30, 32, 33 and the holes 42 from inside and outside of the terrarium container 4. As a result, the triangular flaps 28 and the first and second side walls 20 and 18, 22 are secured to the terrarium container 4 by mechanical fasteners, such as the rivets 34 as the ribs 39 of the ribbed shafts 38 of one of the rivets 34 engage the ribs 39 of the ribbed shafts 38 of the other rivet 34. Similarly, the rear aperture 31 in the rear side wall 20 of the catch tray 10 and the rear wall hole 44 in the terrarium container 4 are aligned, then the rivet 34 is inserted through the aligned aperture 31 and the hole 42 from inside and outside of the terrarium container 4. As a result, the catch tray 10 stands stably upright on a flat surface of the bottom wall 5 of the terrarium container 4. In other words, the catch tray 10 is retained by the side walls 6a, 6b and the rear end wall 7b within the terrarium container 4 by the rivets 34.

Alternatively, or in addition to riveting the catch tray 10 to the terrarium container 4, the catch tray 10 can be adhesively bonded to the interior walls of the terrarium container 4. Specifically, the double-sided adhesive foam gasket 40 is adhesively attached to the top edges of at least the second side walls 18, 22 and the rear side wall 20 of the erected catch tray 10. Next, the erected catch tray 10 with the double-sided adhesive foam gasket 40 is slid into the terrarium container 4 and placed to the bottom wall 5 thereof. Subsequently, a mask is peeled off another side of the double-sided adhesive foam gasket 40 and the top edges of the second side walls 18, 22 and the rear side wall 20 of the catch tray 10 are adhesively bonded to the side walls 6a, 6b and the rear end wall 7b of the terrarium container 4 by the double-sided adhesive foam gasket 40. As a result, the catch tray 10 stands stably upright on a flat surface of the bottom wall 5 of the terrarium container 4. Then, the triangular flaps 28 and the first and second side walls 20 and 18, 22 mat be secured to the terrarium container 4 by mechanical fasteners, such as the rivets 34, as disclosed above.

The foregoing description of the exemplary embodiment of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. An interior catch tray adapted to be placed inside a terrarium container, the interior catch tray erectable from an unfolded state to an assembled state from a single-piece sheet blank, the interior catch tray comprising:
   a rectangular bottom wall defined by first and second opposite folding lines;
   first opposite rectangular side walls, each of the first opposite side walls separated from the bottom wall by one of the first folding lines, each of the first opposite side walls oriented upwardly with respect to the bottom wall and hingedly connected to the bottom wall by the corresponding first folding line; and
   second opposite rectangular side walls, each of the second opposite side walls separated from the bottom wall by one of the second folding lines, each of the second opposite side walls oriented upwardly with respect to the bottom wall and hingedly connected to the bottom wall by the corresponding second folding line;
   each of the first opposite side walls separated from an adjacent one of the second opposite side walls by two triangular corner panels hingedly connected to each other by a corner folding line and to the adjacent first and second side walls by the first and second folding lines;
   the triangular corner panels folded inwardly with respect to the first and second side walls along the corner folding lines so as to define triangle shaped flaps disposed inside the tray between the first and second opposite side walls when the first and second side walls are oriented upwardly with respect to the bottom wall;
   the flaps secured to one of the first and second opposite side walls by at least one mechanical fastener so that each of the flaps partially overlaps one of the first and second side walls,
   wherein each of the triangular corner panels has a corner aperture aligned to each other when the triangular corner panels are folded inwardly along the corner folding lines so as to contact one another,
   wherein each of the two second opposite side walls has a side aperture aligned to the corner apertures of the triangular corner panels when the triangular corner panels are folded inwardly along the corner folding lines so as to contact one another and one of the two second opposite side walls, and
   wherein the at least one mechanical fastener extends through the corner apertures in the triangular corner panels and the side aperture of one of the second opposite side walls.

2. The interior catch tray as defined in claim 1, wherein one of the first side walls is formed with at least one hole.

3. The interior catch tray as defined in claim 1, wherein the first folding lines are perpendicular to the second folding lines.

4. The interior catch tray as defined in claim 1, further comprising an adhesive gasket attached along at least a portion of a top edge of the catch tray.

5. The interior catch tray as defined in claim 4, wherein the adhesive gasket is a double-sided adhesive foam gasket.

6. A terrarium assembly, comprising:
   a terrarium container including a bottom wall, opposite side walls defining longitudinal sides and opposite end walls defining ends; and
   an interior catch tray positioned within the terrarium container along the bottom wall, the interior catch tray comprising:
      a rectangular bottom wall defined by first and second opposite folding lines;
      first opposite rectangular side walls, each of the first opposite side walls separated from the bottom wall by one of the first folding lines, each of the first opposite side walls oriented upwardly with respect to the bottom wall and hingedly connected to the bottom wall by the corresponding first folding line;

second opposite rectangular side walls, each of the second opposite side walls separated from the bottom wall by one of the second folding lines, each of the second opposite side walls oriented upwardly with respect to the bottom wall and hingedly connected to the bottom wall by a corresponding second folding line;

each of the first opposite side walls separated from an adjacent one of the second opposite side walls by two triangular corner panels hingedly interconnected by a corner folding line and to the adjacent first and second side walls by the first and second folding lines;

the triangular corner panels folded inwardly with respect to the first and second side walls and define triangle shaped flaps disposed inside the tray between the first and second opposite side walls;

each of the flaps of the interior catch tray secured to one of the first or second opposite side walls of the interior catch tray and one of the opposite side walls of the terrarium container;

each of the flaps of the interior catch tray fastened to one of the first or second opposite side walls of the interior catch tray and one of the opposite side walls of the terrarium container by a mechanical fastener, wherein the catch tray has at least one aperture, wherein the terrarium container has at least one hole aligned with the at least one aperture through the catch tray when the catch tray is disposed in the terrarium container, wherein the mechanical fastener includes two rivets each including a head and two ribbed shafts axially extending from the head, wherein each of the ribbed shafts has a plurality of ribs formed an outer peripheral surface thereof, and wherein the ribbed shafts of the rivets extend through the at least one aperture in the catch tray and the at least one hole in the terrarium container from opposite sides thereof so that the ribs of the ribbed shafts of the rivets engage the ribs of the ribbed shafts of another rivet to interlock the rivets together to secure the catch tray to the terrarium container.

* * * * *